United States Patent
Tesch

(10) Patent No.: US 9,362,845 B2
(45) Date of Patent: Jun. 7, 2016

(54) METHOD OF OPERATING A SINGLE-PHASE GENERATOR IN PARALLEL WITH AN INVENTOR

(71) Applicant: Generac Power Systems, Inc., Waukesha, WI (US)

(72) Inventor: Tod R. Tesch, Oconomowoc, WI (US)

(73) Assignee: Generac Power Systems, Inc., Waukesha, WI (US)

(*) Notice: Subject to any disclaimer, the term of this patent is extended or adjusted under 35 U.S.C. 154(b) by 364 days.

(21) Appl. No.: 14/138,371

(22) Filed: Dec. 23, 2013

(65) Prior Publication Data

US 2015/0180367 A1 Jun. 25, 2015

(51) Int. Cl.
| | |
|---|---|
| H02K 5/00 | (2006.01) |
| H02M 7/493 | (2007.01) |
| H02J 9/00 | (2006.01) |
| H02P 9/00 | (2006.01) |
| H02P 25/04 | (2006.01) |
| H02P 1/04 | (2006.01) |
| H02K 5/16 | (2006.01) |

(52) U.S. Cl.
CPC ............ *H02M 7/493* (2013.01); *H02J 9/00* (2013.01); *H02P 9/009* (2013.01); *H02P 25/04* (2013.01)

(58) Field of Classification Search
USPC .......................... 322/1; 318/400.33; 310/90.5
See application file for complete search history.

(56) References Cited

U.S. PATENT DOCUMENTS

| 4,857,814 | A | * | 8/1989 | Duncan | ................ | D06F 37/306 318/281 |
|---|---|---|---|---|---|---|
| 5,596,492 | A | | 1/1997 | Divan et al. | | |
| 6,483,321 | B2 | * | 11/2002 | Brasseur | ............. | G01D 5/2412 324/660 |
| 6,693,809 | B2 | | 2/2004 | Engler | | |
| 6,784,634 | B2 | * | 8/2004 | Sweo | ..................... | H02P 9/007 290/46 |
| 6,809,496 | B2 | * | 10/2004 | Anghel | ..................... | H02P 6/18 318/430 |
| 7,557,530 | B2 | * | 7/2009 | Tesch | ..................... | H02P 6/185 318/400.15 |
| 8,217,605 | B2 | * | 7/2012 | Balazovic | ............. | H02P 21/146 318/400.02 |

(Continued)

FOREIGN PATENT DOCUMENTS

| EP | 1226643 | 2/2004 |
|---|---|---|
| JP | 11-018304 | 1/1999 |

(Continued)

OTHER PUBLICATIONS

PCT/US2014/056474, International Search Report and Written Opinion dated Dec. 22, 2014, 11 pages.

(Continued)

*Primary Examiner* — Pedro J Cuevas
(74) *Attorney, Agent, or Firm* — Boyle Fredrickson, S.C.

(57) ABSTRACT

A system for connecting a single-phase generator in parallel with an inverter is disclosed. A signal corresponding to the angular position of the rotor in the generator is provided to the inverter, for example, from an angular position sensor connected to the rotor in the generator. Because variations in the load applied to the generator cause variations in the frequency of the power output by the generator, the inverter synchronizes the phase angle of the voltage output by the inverter to the angular position of the rotor.

13 Claims, 2 Drawing Sheets

(56) References Cited

U.S. PATENT DOCUMENTS

| | | | | |
|---|---|---|---|---|
| 8,674,638 | B2* | 3/2014 | Balazovic | H02P 6/183 318/400.33 |
| 8,736,210 | B2* | 5/2014 | Peto | G01P 3/44 318/400.32 |
| 2002/0014891 | A1* | 2/2002 | Brasseur | G01B 7/30 324/660 |
| 2003/0052643 | A1* | 3/2003 | Sweo | H02P 9/007 318/801 |
| 2004/0052217 | A1* | 3/2004 | Anghel | H02P 6/18 370/254 |
| 2007/0080655 | A1* | 4/2007 | Tesch | H02P 6/185 318/432 |
| 2010/0181952 | A1* | 7/2010 | Cheng | H02P 6/20 318/400.33 |
| 2011/0012544 | A1* | 1/2011 | Schulz | B60L 15/025 318/400.02 |
| 2011/0199031 | A1* | 8/2011 | Balazovic | H02P 23/14 318/400.33 |
| 2011/0248659 | A1* | 10/2011 | Balazovic | H02P 6/183 318/400.33 |
| 2012/0205986 | A1 | 8/2012 | Frampton et al. | |
| 2014/0145660 | A1* | 5/2014 | Shimada | H02P 21/0039 318/400.33 |
| 2014/0252899 | A1* | 9/2014 | Looser | F16C 32/0402 310/90.5 |
| 2014/0365153 | A1* | 12/2014 | Wallin | G01M 1/14 702/66 |
| 2015/0137728 | A1* | 5/2015 | Wand | G05B 19/31 318/605 |
| 2015/0180393 | A1* | 6/2015 | Tesch | H02P 9/007 307/87 |

FOREIGN PATENT DOCUMENTS

| | | |
|---|---|---|
| JP | 2004-104851 | 4/2004 |
| JP | 2004-260953 | 9/2004 |
| KR | 10-2010-0125758 | 12/2010 |

OTHER PUBLICATIONS

M.C. Chandorkar, D.M. Divan, R. Adapa; Wisconsin Electric Machines and Power Electronics Consortium—Research Report (91-8); "Control of Parallel Connected Inverters in Stand-Alone AC Supply Systems"; Jul. 1991—(8 Pages).

Mukul C. Chandorkar, Deepakraj M. Divan, and Rambabu Adapa—"Control of Parallel Connected Inverters in Standalone ac Supply Systems"; IEEE Transactions on Industry Applications, vol. 29, No. 1, Jan./Feb. 1993—(8 Pages).

A. Tuladhar, H. Jin, T. Unger, K. Mauch; "Parallel Operation of Single Phase Inverter Modules With No Control Interconnections"; 1997 IEEE—(7 Pages).

A. Engler; "Control of Parallel Operating Battery Inverters"; 1st PV Hybrid Power Systems Conferences, Sep. 2000—(4 Pages).

SMA Solar Technology AG, "Sunny Island Generator—White Paper"—(27 Pages).

* cited by examiner

METHOD OF OPERATING A SINGLE-PHASE GENERATOR IN PARALLEL WITH AN INVENTOR

FIELD OF THE INVENTION

This invention relates generally to engine-driven, electrical generators, and in particular, to a method for operating a single-phase generator in parallel with an inverter.

BACKGROUND AND SUMMARY OF THE INVENTION

Electrical generators are used in a wide variety of applications. Typically, an individual electrical generator operates in a stand-by mode wherein the electrical power provided by a utility grid is monitored such that, it the commercial electrical power from the utility grid fails, the engine of the electrical generator is automatically started causing the alternator to generate electrical power. When the electrical power generated by the alternator reaches a predetermined voltage and frequency desired by the customer, a transfer switch transfers the load imposed by the customer from the commercial power lines to the electrical generator. As is known, most residential electric equipment in the United States is designed to be used in connection with electrical power having a fixed frequency, namely, sixty (60) hertz (Hz).

Typically, electrical generators utilize a single driving engine coupled to a generator or alternator through a common shaft. Upon actuation of the engine, the crankshaft rotates the common shaft so as to drive the alternator that, in turn, generates electrical power. The frequency of the electrical power output from the alternator is a function of the rotational speed of the driving engine. For example, a two-pole generator outputs sixty (60) hertz (Hz) when the engine is rotating at 3600 revolutions per minute (rpm) but only outputs forty-five (45) Hz when the engine is rotating at 2700 rpm. When the generator includes a single-phase alternator, the alternator has a pulsating torque that ranges from zero (0) to the maximum value corresponding to the generator design.

Improvements in power conversion have led to an increase in distributed power generation. Individual businesses and residences may include, for example, a photovoltaic (PV) array to generate at least a portion of the power required by that business or residence. In addition, a power storage device, such as a battery, may be included to store excess energy generated during periods of peak production and deliver the energy to the business or residence during periods of low production. The power is typically transferred from the alternate energy source or from the battery to the business or residence via an inverter. The inverter is able to generate a voltage waveform synchronized to the utility grid. If the utility grid fails and the business or residence also has an electrical generator, it is desirable to utilize the electrical generator in combination with the alternate energy source or battery.

If two alternating current (AC) power sources arc to be connected in parallel, the AC output voltages must be synchronized otherwise the instantaneous difference in voltage potential may result in current transferred between the two voltage sources. However, the pulsating torque produced by a single-phase generator may result in some fluctuation in frequency of the power output by the generator. Variations in the load applied to the generator may also cause fluctuation in the frequency of the power output by the generator. In contrast, the power output by the inverter is typically regulated at a constant frequency. If the generator is connected in parallel to the inverter, the variable frequency of the output power from the generator produces voltage waveforms from the generator that are out of phase with the constant frequency voltage waveforms output from the inverter.

Therefore, it is a primary object and feature of the present invention to provide a system and method for connecting a single-phase generator in parallel with an inverter.

It is a further object and feature of the present invention to provide a system and method which permits the inverter to run independently of the single-phase generator in a first mode and in parallel with the single-phase generator in a second mode.

In accordance with one embodiment of the present invention, a method for controlling operation of an inverter having an output configured to he connected in parallel with an output of a single-phase generator is disclosed. An input signal is received at the inverter, where the input signal corresponds to a measured or estimated angular position of a rotor in the single-phase generator. The inverter executes a modulation routine to generate an AC voltage at the output of the inverter. The modulation routine receives the input signal corresponding to the angular position of the rotor and synchronizes a phase angle of the AC voltage to the angular position of the rotor. It is contemplated that the signal corresponding to the angular position of the rotor may be generated, for example, by an angular position sensor connected to the rotor, a measured voltage or current output from the single-phase generator, an estimate based on generator parameters, or one or more firing signals corresponding to ignition of fuel in each cylinder of the engine driving the single-phase generator.

According to another aspect of the invention, the inverter may be configured to execute in a first operating mode and in a second operating mode. During the first operating mode, the inverter executes the modulation routine independent of the input signal, and during the second operating mode, the inverter executes the modulation routine to synchronize the phase angle of the AC voltage to the angular position of the rotor. A switch may be used to selectively connect and disconnect the output of the inverter with the output of the single-phase generator. In the first operating mode, the inverter operates with the switch disconnecting the output of the inverter from the output of the single-phase generator. The inverter then receives a second input signal at the inverter corresponding to an indication that the single-phase generator is generating voltage at a desired magnitude and frequency and transitions from the first operating mode to the second operating mode. In the second operating mode, the inverter generates a control signal for the switch to connect the output of the inverter with the output of the single-phase generator.

According to another embodiment of the invention, a system for synchronizing a voltage output by an inverter with a voltage generated by a single-phase generator is disclosed. The single-phase generator includes an engine having a shaft rotated by operation of the engine and an alternator. The alternator includes a rotor operatively coupled to the shaft and a stator having a winding. The rotor is rotated by rotation of the shaft from the engine and the voltage is generated on the winding as a function of the rotation of the rotor. The inverter includes an input configured to receive an input signal corresponding to an angular position of the rotor and a processor configured to execute a modulation routine. The modulation routine receives the input signal corresponding to the angular position of the rotor and synchronizes a phase angle of the voltage output by the inverter to the angular position of the rotor.

These and other objects, advantages, and features of the invention will become apparent to those skilled in the art from the detailed description and the accompanying drawings. It should be understood. however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
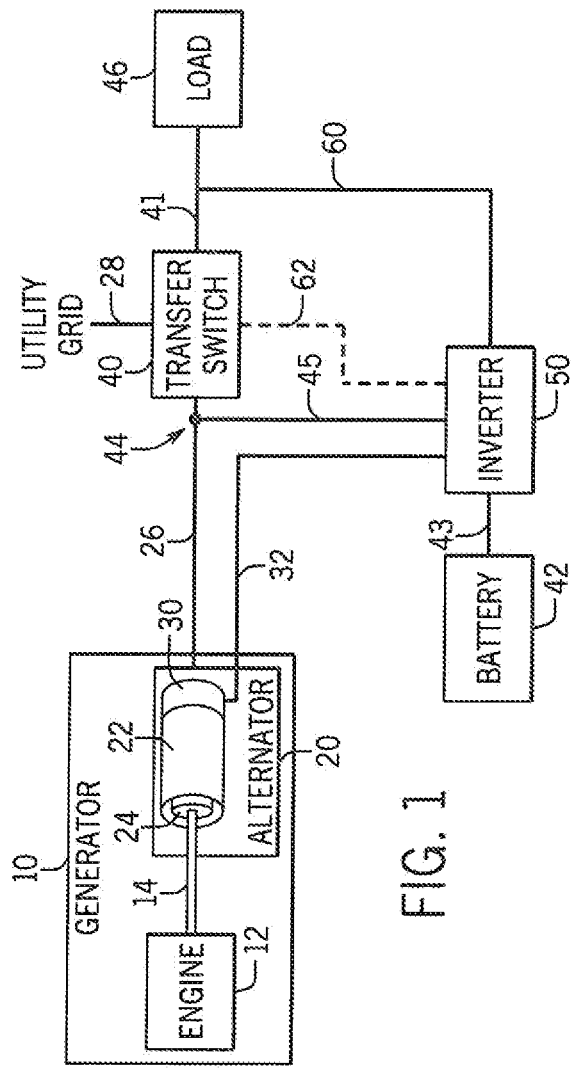
FIG. 1 is a block diagram representation of an engine-driven generator connected in parallel with an inverter according to one embodiment of the present invention.

Referring to FIG. 1, an engine-driven, electrical generator system is generally represented by the reference numeral 10. The generator system 10 includes an alternator 20 defined by a cylindrical rotor 24 rotatably received within the stator 22. It is contemplated that the rotor 24 may include either permanent magnets or a winding configured to establish a magnetic field rotating with the rotor 24. The stator 22 includes a winding in which a single-phase voltage is induced responsive to the rotation of the magnetic field from the rotor 24. As a result, an AC voltage 26 is present at the output of the generator system 10. An angular position sensor 30, such as a resolver or an encoder, may be mounted to the alternator 20 and generate a measured position signal 32 corresponding to the angular position of the rotor 24 within the alternator 20.

The generator system 10 further includes an engine 12. As is conventional, the engine 12 receives fuel such as gasoline, diesel, natural gas, or liquid propane vapor through an intake. The fuel provided to the engine 12 is compressed and ignited within each of the cylinders responsive to a firing signal so as to generate reciprocating motion of the pistons of the engine 12. The reciprocating motion of the pistons of the engine 12 is converted to rotary motion by a crankshaft The crankshaft is operatively coupled to the rotor 24 of the alternator 20 through a shaft 14 such that as the crankshaft is rotated by operation of the engine 12, the shaft 14 drives the rotor 24 of the alternator 20. A controller 1 is provided to control operation of the engine 12. The controller 16 may receive external input signals such as a command to start the engine or an input corresponding to the voltage present on the utility grid 28 such that the controller 16 may start the engine if the utility grid 28 fails. The controller 16 may further receive signals from the alternator 20 which, for example, correspond to the voltage and/or current generated by the alternator 20. The controller 20 may use the voltage and/or current signals to generate an estimated position signal that may be transmitted to the inverter 50 instead of, or in combination with, the measured position signal 32.

Figure 2:
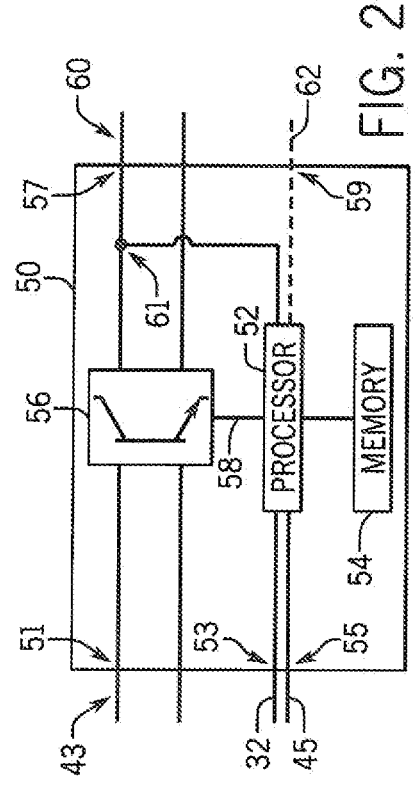
FIG. 2 is a block diagram representation of the inverter of FIG. 1.

The generator system 10 is connected in parallel with an inverter 50. Referring also to FIG. 2, the inverter 50 includes a processor 52 and memory 54. The processor 52 may be a single processor or multiple processors operating in parallel. The memory 54 may be a single device or multiple devices and may include volatile memory, non-volatile memory, or a combination thereof. The processor 52 is configured to execute instructions stored in the memory 54 to control operation of the inverter 50. The inverter 50 includes a power input 51 configured to receive an input voltage 43 from a power source. According to the embodiment illustrated in FIG. 1 the power source is a battery 42. Optionally, the power source may be a photovoltaic (PV) array or other alternate energy source. The inverter 50 also includes a power conversion section 56 and a power output 57. The power conversion section 56 receives the input voltage 43 and provides a regulated output voltage 60 at the power output 57. According to the illustrated embodiment, the battery 42 provides a DC voltage to the inverter 50. The power conversion section 56 includes multiple switches, such as insulated gate bipolar transistors (IGBTs), metal-oxide semiconductor field effect transistors (MOSFETs), silicon controlled rectifiers (SCRs), or the like. The switches are controlled by a modulation routine stored in memory 54 and executed by the processor 52 to selectively connect and disconnect the power input 51 to the power output 57. The resultant output voltage 60 is a modulated waveform having a fundamental AC component at a desired amplitude and frequency. Optionally, the power conversion section 56 may be configured for bidirectional power transfer, As a result, during periods when the utility grid is providing power to the load 46 or when the generator 10 is providing excess, the inverter 50 may convert an AC voltage available at the output 57 to a DC voltage suitable for charging the battery 42.

The inverter 50 may also include two inputs 53, 55 configured to receive control signals. A first input 53 is configured to receive a signal, such as the position signal 32 from the angular position sensor 30, corresponding to an angular position of the rotor 24 in the alternator 20. The processor 52 uses the angular position of the rotor 24 to generate gating signals 58 for the power conversion section 56. The gating signals are used to enable and disable the switches and are controlled to generate the desired AC output voltage 60. The inverter may also include one or more sensors 61 connected to the output of the power conversion section 56 with each sensor 61 generating a signal to the processor 52 corresponding to a magnitude of voltage or current output from the power conversion section 56. The processor 52 also utilizes the voltage and/or current signal's in the modulation routine for generation of the gating signals 58.

The inverter 50 may also be configured to receive a feedback signal 45 from a sensor 44 operatively connected to the output of the generator system 10. Optionally, multiple sensors 44 may be provided with each generating a feedback signal 45 to the inverter 50. The sensor 44 may be configured to detect a magnitude of voltage or a magnitude of current and generate a voltage feedback signal or a current feedback signal, respectively. A second input 55 is configured to receive the voltage and/or current feedback. signals 45. It is contemplated that the voltage and/or current feedback signal 45 may be utilized to determine the angular position of the rotor 24.

As previously discussed, the engine 12 receives a firing signal for each cylinder to ignite the fuel therein, causing the reciprocating motion of the pistons and subsequent rotation of the crankshaft. A controller for the engine 12 is configured to generate these firing signals when the piston is at the top of its stroke, forcing the piston down the cylinder. Because each piston is mechanically coupled to the crankshaft, each piston reaches the upper and lower ends of its stroke at substantially the same angular position during each revolution of the crankshaft. Further, the crankshaft drives the shaft 14 coupled to the alternator. Therefore, each firing signal for each cylinder occurs at substantially the same angular position of the rotor. According to yet another embodiment of the invention, the first input 53 nay be configured to receive an input (or multiple inputs) corresponding to each firing signal. The processor 52 may utilize the firing signals to determine the angular position of the rotor 24.

Referring again to FIG. 1, a transfer switch 40 may be utilized to selectively connect the generator system 10 to the load. it is contemplated that the transfer switch 40 may be a single switch or a combination of multiple switches controlled to move between a first position and a second position either in tandem or sequentially. According to the illustrated embodiment, the transfer switch 40 selectively connects the utility grid 28 or the output voltage 26 from the generator system 10 to a load 46. A sensor (not shown) monitors the status of the utility grid 28. The sensor may be a separate sensor or integral, for example, to the transfer switch 40, to the inverter 50, or to a separate system controller (not shown). A connection 62 between the transfer switch 40 and the inverter 50 indicates that one or more inputs and/or outputs (I/O) 59 are connected between the inverter 50 and the transfer switch 40 according to the application requirements. The I/O 59 may be configured, for example, to receive feedback signals corresponding to the operation of the grid or to provide control signals to the transfer switch 40 to move the throw of the transfer switch 40 between a first pole and a second pole. As illustrated, the inverter 50 is continuously connected to the load 46 and alternately operates in parallel with either the voltage from the utility grid 28 or the voltage 26 output from the generator. Optionally, the inverter 50 may be connected in parallel and switched together with the output from the generator system 10.

In operation, the inverter 50 may be configured to operate either independently of or in cooperation with the generator system 10. When the inverter 50 is operating independently of the generator system 10, it may be operating in cooperation with the utility grid 28. As illustrated in FIG. 1, the inverter 50 may be continually connected to the load 46. When the utility grid 28 is connected to the load 46, the inverter 50 may be configured to draw power from the utility grid 28 to charge the battery 42. When the utility grid fails, the inverter 50 may draw energy from the battery 42 to provide power to the load 46. Optionally, the inverter 50 may be connected between another energy source, such as a PV array. The inverter 50 may be configured to supply power from the other energy source to the load 46 in parallel with the utility grid 28. Because the inverter 50 is supplying power directly to the load 46, the output voltage 60 is at the same frequency as that supplied by the utility grid 28 (e.g., 60 Hz), and when operating in parallel with the utility grid 28, the inverter 50 synchronizes the output voltage 60 with the voltage provided by the utility grid 28.

When the utility grid 28 fails, the inverter 50 is configured to operate in cooperation with the generator system 10, initially, the generator system 10 is typically in an idle state because power is supplied to the load 46 by the utility grid 28 and/or the alternate energy source via the inverter 50. The generator system 10 may include an input that monitors the state of the utility grid 28 or receives an input commanding the generator system 10 to start up and begin generating power. The generator system 10 requires a short duration during which the engine 12 accelerates up to a desired speed and the alternator 20 begins generating electricity at a desired frequency. During this ramp-up period for the generator system 10, the inverter 50 may be commanded to immediately begin supplying power to the load 46. if the inverter 50 had been supplying power in tandem with the utility grid 28, it may continue supplying power at the same frequency. If the inverter 50 was charging the battery 42, it may switch operation to draw energy from the battery 42 and supply power to the load 46 at a desired frequency (e.g., 60 Hz) and at an arbitrary phase angle since it is initially operating independently of any other power source.

Once the generator system 10 has completed an initial start-up sequence, it may begin supplying power to the load 46. As is known, the frequency of the AC voltage 26 at the output of the generator system 10 is dependent upon the number of poles and the rotational speed of rotor 24 which corresponds, in turn, to the speed of engine 12. It is noted that during transient operations the engine 12 of the generator system 10 does not operate at a fixed, constant speed, but will deviate, and may deviate significantly, from the synchronous speed when the magnitude of the load 46 changes. In other words, when additional current is required from the alternator 20 by a load 46, the engine speed will decrease momentarily as it attempts to increase the power output. Conversely, when the current required from the alternator 20 by a load 46 decreases, the engine speed will increase momentarily as it attempts to reduce the power output. Changes in the magnitude of the load 46, therefore, result in variations in the speed of the engine 12, which in turn, results in variations in the frequency and voltage at the output of the alternator 20.

The transfer switch 40 is controlled to alternately connect either the utility grid 28, in a first position, or the generator system 10, in a. second position, to the load 46. It is contemplated that the transfer switch 40 may be a single switch simultaneously transferring each of the electrical conductors 41 to the load 46 with either the utility grid 28 or the generator system 10. Optionally, the transfer switch 40 may include multiple switches operated in a predetermined order to transfer each of the electrical conductors 41 to the load 46 in a sequential order. The transfer switch 40 may include a sensor configured to monitor operation of the utility grid 28, and the transfer switch 40 may be configured to automatically switch between the first and the second positions based on the state of the utility grid 28. Optionally, the transfer switch 40 may include an input configured to receive a command to switch between the first and the second positions. The command may be generated by the generator system 10, the inverter 50, or an external controller.

Figure 3:
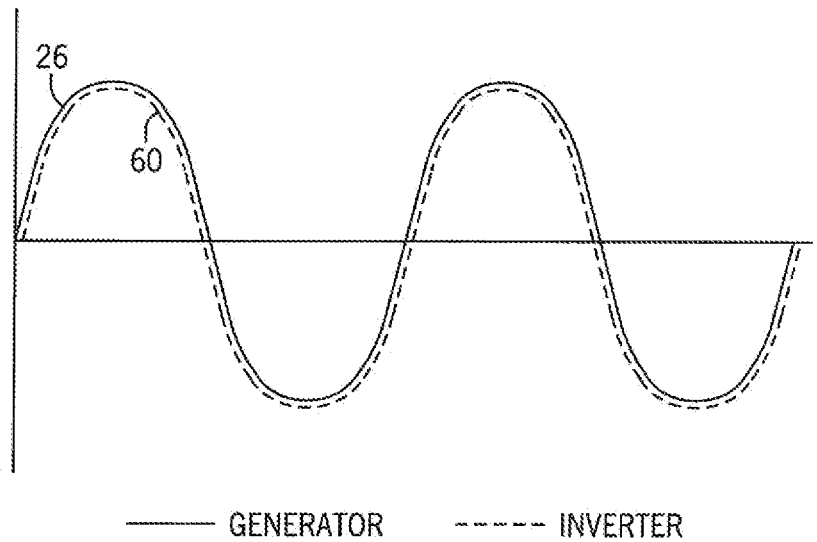
FIG. 3 is a graphical representation of an output voltage from the inverter synchronized to an output voltage from the generator.

According to the embodiment shown in FIG. 1, the inverter 50 may be configured to control operation of the transfer switch 40. The inverter 50 is providing power to the load 46 at a desired frequency. Optionally if the utility grid 28 is present, the inverter 50 may control charging of the battery using power from the utility grid 28. When the utility grid 28 fails, the inverter 50 may either monitor the output voltage 26 from the generator system 10 via a voltage and/or current sensor 44 or receive an input signal from the generator system 10 indicating that the generator system has completed its initial ramp up. The inverter 50 also receives a position signal 32 at an input 53 corresponding to an angular position of the rotor 24 of the alternator 20. The inverter 50 adjusts the phase angle of the output voltage 60 produced by the inverter 50 such that it is synchronized with the angular position of the rotor 24. Once the inverter 50 is generating an output voltage 60 synchronized with the AC voltage 26 from the generator system 10, the inverter 50 may output a control signal to the transfer switch 40 such that the transfer switch 40 connects the generator system 10 to the load 46. With reference to FIG. 3, the AC voltage 26 from the generator system 10 and the output voltage 60 from the inverter 50 are synchronized with each other and may be provided in parallel to the load 46. It is further contemplated that the inverter 50 may be controlled to offset the angle of the output voltage 60 produced by the inverter 50 to control sharing of the load 46 between the inverter 50 and the generator system 10. Similarly, the inverter 50 may control the angle of the output voltage 60 to cause current to flow into the inverter in order to charge the battery 42 from power supplied by the generator system 10.

Figure 4:
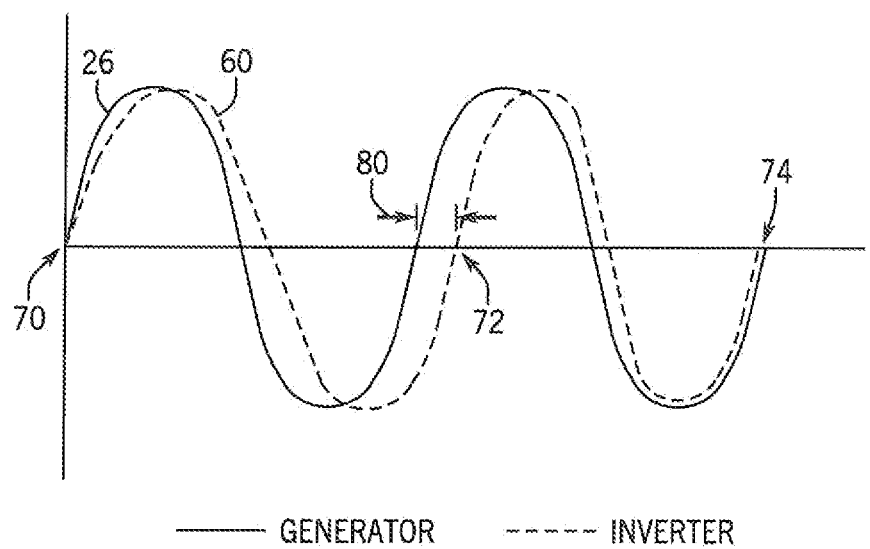
FIG. 4 is a graphical representation of the inverter compensating the phase angle of the output voltage of the inverter in response to a fluctuation in the output voltage from the generator.

As previously indicated, however, the output frequency of the AC voltage 26 generated by the generator system 10 is subject to fluctuations, for example, from torque pulsations and/or load variations. The inverter 50 uses the position signal to adjust the phase angle of the output voltage 60 such that it remains synchronized with the fluctuations from the AC voltage 26 generated by the generator system 10. With reference to FIG. 4, the AC voltage 26 is illustrated as increasing in frequency and the inverter 50 compensating accordingly. At the start 70 of the graph, the two voltages 26, 60 are synchronized. The generator system 10 receives a disturbance causing the frequency of the AC voltage 26 to increase. At the mid-point 72 of the graph, an error 80 in the phase angle between the AC voltage 26 and the output voltage 60 exists. The inverter 50 begins compensating for the error 80 such that the phase angle of the output voltage 60 changes and, in turn, the frequency of the output voltage 60 changes to match the frequency of the AC voltage 26. At the end 74 of the graph, the two voltages 26, 60 are again synchronized.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

I claim:

1. A method fur controlling operation of an inverter having an output configured to be connected in parallel with an output of a single-phase generator, wherein the single-phase generator includes a stator and a rotor, the method comprising the steps of
   receiving an input signal at the inverter, the input signal corresponding to an angular position of the rotor in the single-phase generator; and
   executing a modulation routine in the inverter to generate an alternating current (AC) voltage, having a phase angle, at the output of the inverter, wherein the modulation routine receives the input signal corresponding to the angular position of the rotor and synchronizes the phase angle of the AC voltage to the angular position of the rotor.

2. The method of claim further comprising the initial step of connecting an angular position sensor to a shaft of the generator, wherein the angular position sensor generates the input signal to the inverter.

3. The method of claim I further comprising the steps of:
   measuring one of a voltage and a current from the output of the single-phase generator; and
   providing the measured voltage or current as an input to the inverter, wherein the measured voltage or current is the input signal corresponding to the angular position of the rotor.

4. The method of claim 1 wherein the single-phase generator is driven by an engine having at least one cylinder and wherein the input signal corresponds to a firing signal for each of the cylinders.

5. The method of claim 1 wherein the inverter is configured to execute in a first operating mode and in a second operating mode and wherein during the first operating mode, the inverter executes the modulation routine independent of the input signal and during the second operating mode, the inverter executes the modulation routine to synchronize the phase angle of the AC voltage to the angular position of the rotor.

6. The method of claim 5, wherein a switch selectively connects and disconnects the output of the inverter with the output of the single-phase generator wherein the inverter initially executes in the first operating mode with the switch disconnecting the output of the inverter from the output of the single-phase generator, the method further comprising the steps of:
   receiving a second input signal at the inverter corresponding to the single-phase generator generating voltage at a desired magnitude and a desired frequency;
   transitioning the inverter from the first operating mode to the second operating mode; and
   when the phase angle at the output of the inverter is synchronized to the angular position of the rotor, generating a control signal for the switch to connect the output of the inverter with the output of the single-phase generator.

7. A. system for synchronizing a voltage output by an inverter with a voltage generated by a single-phase generator, the system comprising:
   the single-phase generator including:
      an engine having a shaft rotated by operation of the engine, and
      an alternator including a rotor operatively coupled to the shaft and a stator having a winding, wherein the rotor is rotated by rotation of the shaft and wherein the voltage is generated on the winding as a function of the rotation of the rotor; and
   the inverter including:
      an input configured to receive an input signal corresponding to an angular position of the rotor, and
      a processor configured to execute a modulation routine, wherein the modulation routine receives the input signal corresponding to the angular position of the rotor and synchronizes a phase angle of the voltage output by the inverter to the angular position of the rotor.

8. The system of claim 7 further comprising an angular position sensor operatively coupled to the rotor and configured to generate a position signal corresponding to the angular position of the rotor, wherein the position signal from the angular position sensor is operatively connected to the input of the inverter.

9. The system of claim 7 further comprising at least one sensor configured to generate a voltage signal corresponding to an amplitude of the voltage generated on the winding, wherein the voltage signal is operatively connected to the input of the inverter.

10. The system of claim 7 wherein the engine includes at least one cylinder and at least one output signal, wherein the at least one output signal corresponds to a firing signal for each of the cylinders and the at least one output signal is operatively connected to the input of the inverter.

11. The system of claim 7 wherein the voltage output from the inverter and the voltage generated by the single-phase generator are provided in parallel to at least one electrical load, the system further comprising a Witch configured to selectively connect and disconnect the voltage generated by the single-phase generator with the at least one electrical load.

12. The system of claim 11 wherein the inverter is configured to execute in a first operating mode and in a second operating mode and wherein during the first operating mode, the inverter executes the modulation routine independent of the input signal and during the second operating mode, the inverter executes the modulation routine to synchronize the phase angle of the AC voltage to the angular position of the rotor.

13. The system of claim 12 wherein the inverter further includes:
    a second input configured to receive a second input signal indicating that the single-phase generator is generating the voltage at a desired magnitude and a desired frequency; and
    an output operatively connected to the switch, wherein the output provides a control signal to selectively connect and disconnect the voltage generated by the single-phase generator as a function of the second input signal.

* * * * *

UNITED STATES PATENT AND TRADEMARK OFFICE
CERTIFICATE OF CORRECTION

| | | |
|---|---|---|
| PATENT NO. | : 9,362,845 B2 | Page 1 of 1 |
| APPLICATION NO. | : 14/138371 | |
| DATED | : June 7, 2016 | |
| INVENTOR(S) | : Tod R. Tesch | |

It is certified that error appears in the above-identified patent and that said Letters Patent is hereby corrected as shown below:

On the title page and in the specification, column 1

Please amend the title to read as follows:

-- Method Of Operating A Single-Phase Generator In Parallel With An Inverter --

Signed and Sealed this
Ninth Day of August, 2016

Michelle K. Lee
*Director of the United States Patent and Trademark Office*